United States Patent [19]

Vincent

[11] Patent Number: 4,460,249

[45] Date of Patent: Jul. 17, 1984

[54] CONTROL SYSTEM FOR AN OPTICAL MODULATOR

[75] Inventor: Denis M. Vincent, Sainte Foy, Canada

[73] Assignee: Minister of National Defense of Her Majesty's Canadian Government, Ottawa, Canada

[21] Appl. No.: 309,104

[22] Filed: Oct. 6, 1981

[30] Foreign Application Priority Data

Oct. 27, 1980 [CA] Canada .................................. 363291

[51] Int. Cl.³ .............................................. G02F 1/03
[52] U.S. Cl. ...................................... 350/356; 372/26; 372/29; 372/28; 332/7.51
[58] Field of Search ......................... 372/26, 28, 29, 32, 372/20, 21, 12; 350/356, 355, 288; 332/7.51

[56] References Cited

U.S. PATENT DOCUMENTS

| | | | |
|---|---|---|---|
| 3,586,997 | 6/1971 | Kinsel | 372/29 |
| 3,594,660 | 7/1971 | Huggett | 372/29 |
| 3,743,969 | 7/1973 | Hutchings | 372/28 |
| 4,068,197 | 1/1978 | Yamazaki et al. | 372/26 |
| 4,071,751 | 1/1978 | Waksberg | 372/26 |
| 4,221,960 | 9/1980 | Maeda et al. | 372/29 |

Primary Examiner—William L. Sikes
Assistant Examiner—Léon Scott, Jr.
Attorney, Agent, or Firm—Cushman, Darby & Cushman

[57] ABSTRACT

A control system for a laser-intensity-modulator system to maintain the modulated component of the output beam at a constant amplitude. The electro-optical modulator has a resonant driving circuit supplied by a voltage controlled oscillator. A portion of the output beam is detected and a control signal representative of the amplitude of the modulated component is derived and supplied to the oscillator in addition to the normal bias voltage which sets the nominal frequency. This stabilizes the amplitude of the modulated component in the output beam.

4 Claims, 1 Drawing Figure

CONTROL SYSTEM FOR AN OPTICAL MODULATOR

This application relates to a control system for providing a constant amplitude of intensity-modulation at the output of an optical modulator used in conjunction with a laser.

In transmission spectroscopy it is necessary to compute the ratio of the output to input signal. Two detectors may be used but any departure from identical characteristics will cause error. The control system of this invention avoids the use of two identical detectors. Further, problems are caused by the inherent low frequency noise in laser beams which limits the available signal-to-noise ratio. It is known to reduce fluctuations in laser output by passing the beam through a Stark cell. The absorption frequency of the cell is varied in accordance with the output beam. This does not meet the problem of variations in the modulation amplitude imposed on the laser beam unless a second stabilizer is used. The same is true with known electro-optical and acousto-optical laser regulators.

The present invention provides stabilization at the modulator itself. Specifically, the invention relates to a control system for an optical modulator used to modulate the intensity of a laser beam at a nominal modulating frequency wherein the transmission of the modulator is a non-linear function of the driving frequency. The control system includes a wide-band detector responsive to a sampled portion of the modulator output beam to provide a first signal. A demodulator is responsive to the first signal to provide a control voltage proportional to the amplitude of the modulating frequency component. A bias voltage source is provided and a voltage controlled oscillator is responsive to the sum of the bias voltage and the control voltage to provide the driving frequency. A driver circuit for the modulator is responsive to the output from the oscillator, whereby the system functions to stabilize the modulation amplitude.

A preferred embodiment of the invention will be described in conjunction with the accompanying drawing which shows a schematic diagram of the control system of this invention.

DESCRIPTION OF THE PREFERRED EMBODIMENT

Figure 1:
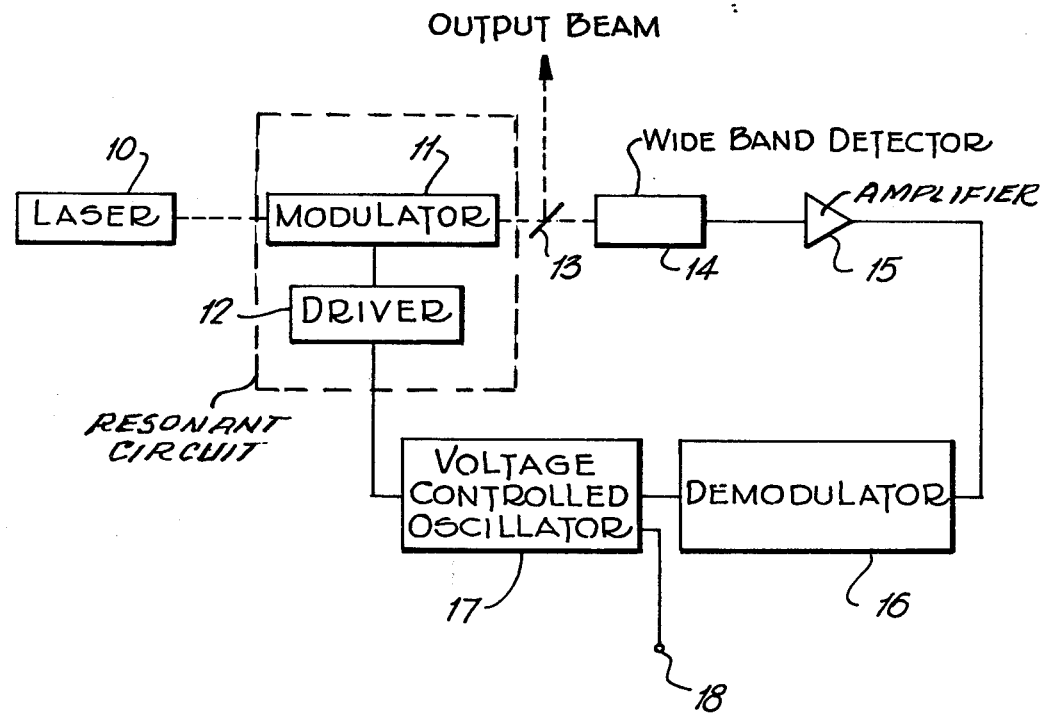

FIG. 1 shows a suitable control system for a CW gas laser 10. The output beam passes through an electro-optic modulator 11, typically a cadmium telluride crystal. The crystal and its electrodes also form the capacitor of a series LC circuit comprising a choke element or inductance. The driver (12) may include an amplifier. The output beam, typically used for transmission spectroscopy, is obtained via a partially reflecting mirror 13. For accuracy in spectroscopy measurement, the modulated component of the beam should be stabilized.

A small sampled portion of the output beam is transmitted by mirror 13 and falls on a suitably biased wideband detector 4. The electrical signal from the detector is amplified in an amplifier 15 and demodulated in a demodulator 16. The major component of the signal from amplifier 15 will be the modulation applied to modulator 11 and, normally, a point contact diode will provide sufficient output signal to be used as demodulator 16. If signal-to-noise ratio becomes critical then demodulator 16 may be a synchronous demodulator with the system supplying an appropriate signal at the modulating frequency. The output from demodulator 16 is a control signal applied to voltage controlled oscillator 17. Terminal 18 supplies a bias voltage input which governs the nominal value of modulating frequency. The control signal and bias voltage are added to provide the voltage control of oscillator 17.

Thus, the voltage controlled oscillator provides a signal in the region of the nominal modulating frequency which drives modulator 11. Since the drive for the modulator is a series resonant circuit any variation in the frequency supplied to the driver will result in a variation of the amplitude of the modulated component in the output beam. This, in turn, results in a variation in the signal from the output of demodulator 16 which is applied to voltage controlled oscillator 17 in a sense so as to oppose the change. Thus, regulation of the amplitude component of the modulator output is obtained and it is held constant.

Thus, a control system which maintains the modulation component constant has been described. A typical system operating at a modulation frequency of 384 kHz has obtained a noise reduction of over 10 dB at 120 Hz while maintain the modulator transmission at 80% of maximum.

The embodiments of the invention in which an exclusive property or privilege is claimed are defined as follows:

1. A control system for an optical modulator, said optical modulator used to modulate the intensity of a laser beam to produce a modulated laser output beam wherein transmission of the modulator is a non-linear function of its driving frequency, the control system comprising:
   a wide-band detector means responsive to a sampled portion of the modulated laser output beam for providing a first signal;
   a demodulator means responsive to said first signal for providing a control voltage proportional to the amplitude of the modulating frequency component of said first signal;
   a bias voltage source means for providing a bias voltage;
   a voltage controlled oscillator means responsive to the sum of said bias voltage and said control voltage for providing an output at said driving frequency; and
   driver circuit means for the modulator and responsive to the output from the oscillator means, said driver circuit means and modulator constituting a resonant circuit such that any variation in the frequency supplied to said resonant circuit results in a variation of the amplitude of the output beam so that the intensity of the laser beam is stabilized.

2. A control system as set out in claim 1 wherein the demodulator means is a detector.

3. A control system as set out in claim 1 wherein the optical modulator is an acousto-optic modulator with different modulating and driving frequencies.

4. A control system as set out in claim 3, wherein said modulator includes a dielectric and two electrodes constituting a capacitor in said resonant circuit.

* * * * *